US012267647B2

(12) United States Patent
Greenlee

(10) Patent No.: US 12,267,647 B2
(45) Date of Patent: Apr. 1, 2025

(54) ULTRASONIC PROXIMITY SENSORS, AND RELATED SYSTEMS AND METHODS

(71) Applicant: Apple Inc., Cupertino, CA (US)

(72) Inventor: Charles L. Greenlee, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 112 days.

(21) Appl. No.: 17/152,694

(22) Filed: Jan. 19, 2021

(65) Prior Publication Data

US 2021/0144481 A1 May 13, 2021
US 2022/0070592 A9 Mar. 3, 2022

Related U.S. Application Data

(63) Continuation of application No. 16/259,211, filed on Jan. 28, 2019, now Pat. No. 10,932,062.
(Continued)

(51) Int. Cl.
*H04R 25/00* (2006.01)
*G01H 11/08* (2006.01)
(Continued)

(52) U.S. Cl.
CPC ............ *H04R 17/10* (2013.01); *G01H 11/08* (2013.01); *H04R 1/1016* (2013.01);
(Continued)

(58) Field of Classification Search
CPC .. H04R 17/10; H04R 1/1016; H04R 2420/07; H04R 2499/11; H04R 5/033; H04R 5/04;
(Continued)

(56) References Cited

U.S. PATENT DOCUMENTS 6,239,705 B1* 5/2001 Glen .................... G08B 21/028
340/573.4
6,671,226 B1* 12/2003 Finkel .................... A61H 3/068
367/116
(Continued)

FOREIGN PATENT DOCUMENTS

CN 1688252 A 10/2005
CN 101010981 A 8/2007
(Continued)

OTHER PUBLICATIONS

Chinese Office Action from Chinese Patent Application No. 20190119264.1, dated Apr. 12, 2021, 18 pages including English language summary.
(Continued)

*Primary Examiner* — Phylesha Dabney
(74) *Attorney, Agent, or Firm* — BAKERHOSTETLER

(57) ABSTRACT

An ultrasonic proximity sensor can determine one or more characteristics of a local environment. For example, the sensor can emit an ultrasonic signal into a local environment and can receive an ultrasonic signal from the local environment. From a measure of correlation between the emitted and the received signals, the sensor can classify the local environment. By way of example, such a sensor can assess whether an in-ear earphone is positioned in a user's ear. A media device in communication with the sensor can transmit an audio signal to the earphone for audio playback responsive to a determination by the sensor that the earphone is in the user's ear and can redirect the audio signal to another playback device responsive to a determination by the sensor that the earphone is not in the user's ear. Related and other aspects also are described.

21 Claims, 8 Drawing Sheets

Related U.S. Application Data

(60) Provisional application No. 62/631,670, filed on Feb. 17, 2018.

(51) Int. Cl.
| | | |
|---|---|---|
| *H04R 1/10* | (2006.01) | |
| *H04R 5/033* | (2006.01) | |
| *H04R 5/04* | (2006.01) | |
| *H04R 17/10* | (2006.01) | |
| *H04S 7/00* | (2006.01) | |

(52) U.S. Cl.
CPC ........... *H04R 1/1041* (2013.01); *H04R 5/033* (2013.01); *H04R 5/04* (2013.01); *H04S 7/304* (2013.01); *H04R 2420/07* (2013.01); *H04R 2460/03* (2013.01); *H04R 2460/15* (2013.01); *H04R 2499/11* (2013.01)

(58) Field of Classification Search
CPC .............. H04R 1/1041; H04R 2460/03; H04R 2460/15; H04S 7/304; G01H 11/08
USPC .......................................................... 381/190
See application file for complete search history.

(56) References Cited

U.S. PATENT DOCUMENTS

| | | | |
|---|---|---|---|
| 8,750,527 | B2 | 6/2014 | Tiscareno et al. |
| 9,042,588 | B2 | 5/2015 | Aase |
| 9,486,823 | B2 | 11/2016 | Andersen et al. |
| 9,699,546 | B2 | 7/2017 | Qian et al. |
| 2003/0028110 | A1* | 2/2003 | Toda ................. A61B 7/04 600/437 |
| 2006/0045304 | A1 | 3/2006 | Lee et al. |
| 2007/0165872 | A1* | 7/2007 | Bridger ............... A61B 7/04 600/528 |
| 2007/0297634 | A1 | 12/2007 | Hansson |
| 2008/0110261 | A1 | 5/2008 | Randall et al. |
| 2011/0129101 | A1* | 6/2011 | Hooley ................. H04R 3/005 381/92 |
| 2012/0114154 | A1 | 5/2012 | Abrahamsson |
| 2012/0212484 | A1 | 8/2012 | Haddick et al. |
| 2013/0083933 | A1 | 4/2013 | Aase |
| 2013/0121495 | A1 | 5/2013 | Mysore |
| 2013/0136321 | A1 | 5/2013 | Lee et al. |
| 2015/0077351 | A1 | 3/2015 | Lee |
| 2016/0345113 | A1 | 11/2016 | Lee et al. |
| 2017/0078780 | A1 | 3/2017 | Qian et al. |
| 2018/0049716 | A1* | 2/2018 | Rajagopal ............ A61B 5/7257 |
| 2019/0353781 | A1* | 11/2019 | Piskun .................... G01S 15/88 |

FOREIGN PATENT DOCUMENTS

| | | |
|---|---|---|
| CN | 101862202 A | 10/2010 |
| CN | 103097041 | 5/2013 |
| CN | 103945786 A | 7/2014 |
| CN | 203759644 | 8/2014 |
| CN | 104509129 | 4/2015 |
| CN | 104936529 A | 9/2015 |
| CN | 105247889 | 1/2016 |
| CN | 107004403 | 8/2017 |
| CN | 107396228 A | 11/2017 |
| CN | 206908789 | 1/2018 |
| CN | 107684673 A | 2/2018 |
| DE | 102004019353 B3 | 9/2005 |
| EP | 2271134 A1 | 1/2011 |
| JP | 2012-518515 | 8/2012 |
| JP | 2016-001775 A | 1/2016 |
| WO | WO 2009/137147 | 11/2009 |
| WO | WO 2017/048476 | 3/2017 |
| WO | WO 2017/105809 | 6/2017 |

OTHER PUBLICATIONS

Office Action with Search Report in Chinese Application No. 20190119264.1, mailed Jul. 27, 2020, 13 pages.

Patent Evaluation Report issued by China's State Intellectual Property Office on Jan. 16, 2020, for Chinese Utility Model Registration No. 201920205348.2, issued Nov. 19, 2019.

Bratoszewski et al., "Examining Acoustic Emission of Engineered Ultrasound Loudspeakers," SPA 2014 (Signal Processing Algorithms, Architectures, Arrangements and Applications), Sep. 2014, 6 pages.

Li, et al., "One-dimensional MEMS capacitive ultrasonic transducer arrays based on C-SOI technology," Sensors and Microsystems, vol. 34, No. 3, May 2015, 4 pages.

Zhang, et al., "Design of a Multi-sensor Intelligent Guiding Device," Industrial Control Computer, vol. 26, No. 11, Nov. 2013, 3 pages.

Chinese Office Action from Chinese Patent Application No. 202111345578.7, dated Oct. 25, 2023, 23 pages including English language summary.

Chinese Notification to Grant Patent from Chinese Patent Application No. 202111345578.7, dated Mar. 1, 2024, 5 pages including machine-generated English language translation of Notice.

* cited by examiner

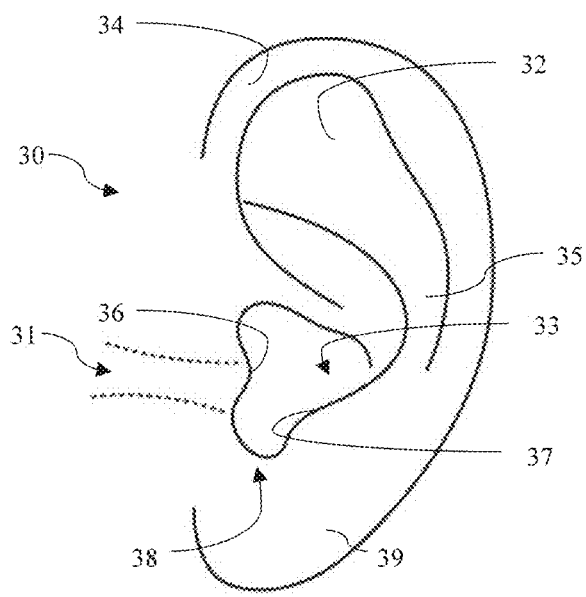 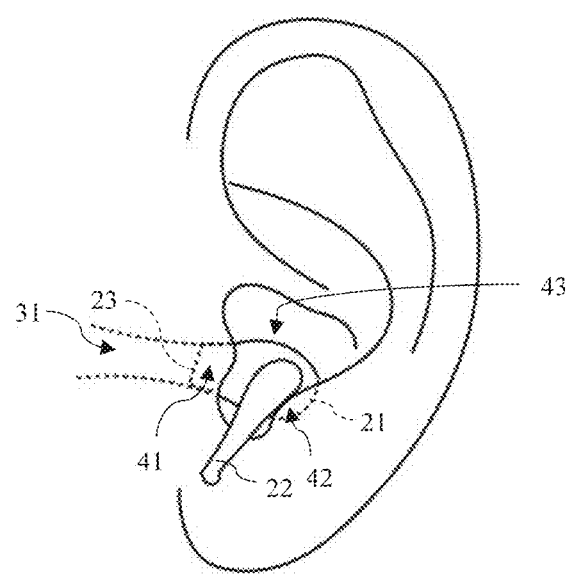
FIG. 3   FIG. 4
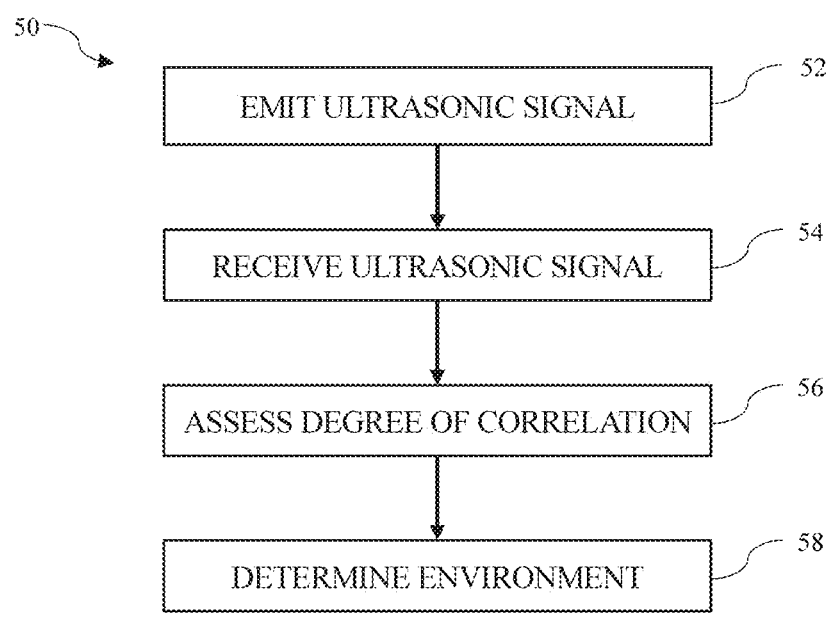
FIG. 5

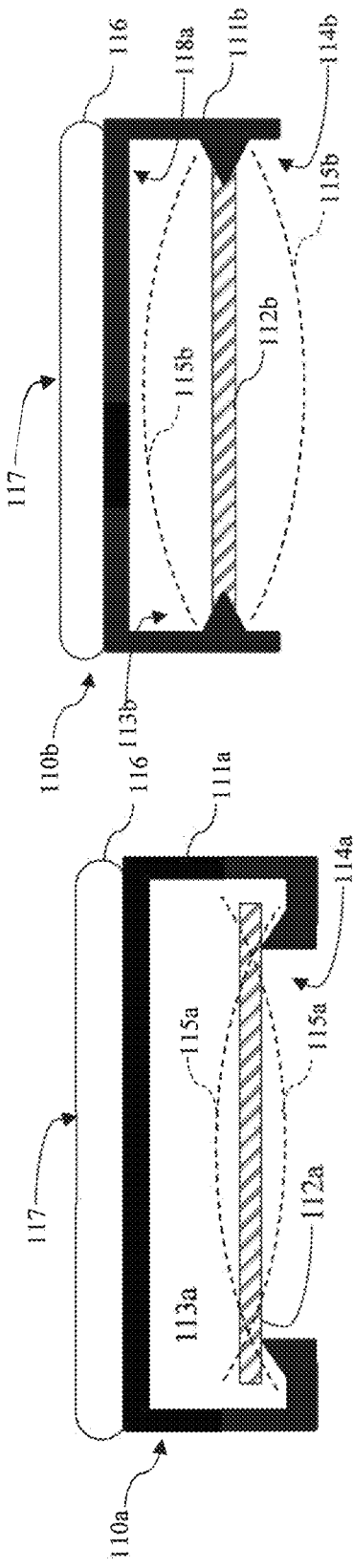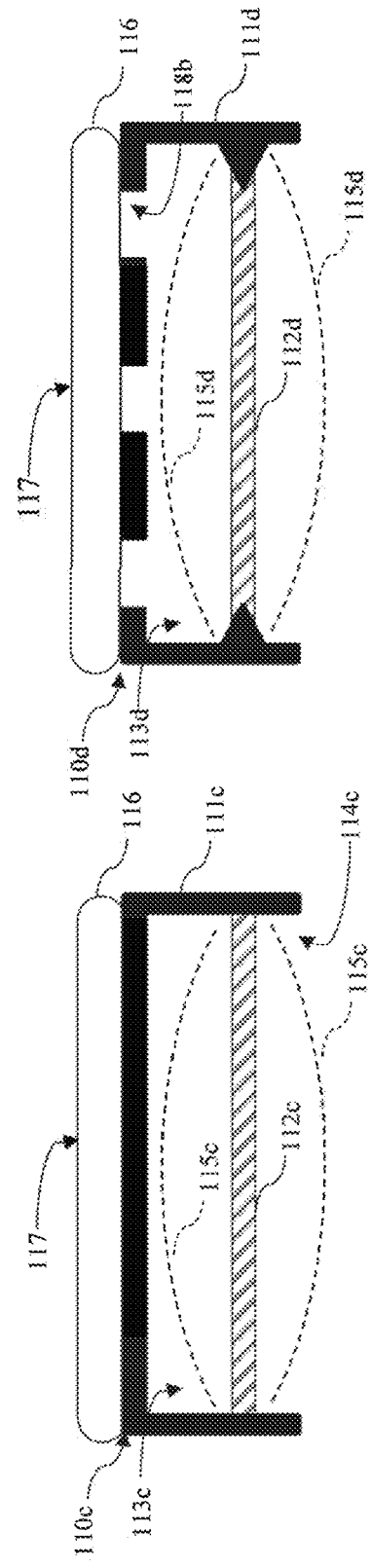

ULTRASONIC PROXIMITY SENSORS, AND RELATED SYSTEMS AND METHODS

CROSS REFERENCE TO RELATED APPLICATIONS

The present application is a continuation of U.S. patent application Ser. No. 16/259,211 entitled "Ultrasonic Proximity Sensors, And Related Systems And Methods," filed Jan. 28, 2019, which claims the benefit of U.S. Provisional Patent Application No. 62/631,670, entitled "Ultrasonic Proximity Sensors, And Related Systems And Methods," filed on Feb. 17, 2018, the disclosure each of which is hereby incorporated herein in its entirety.

FIELD

This application and related subject matter (collectively referred to as the "disclosure") generally concern ultrasonic proximity sensors, and related systems and methods. More particularly, but not exclusively, this disclosure pertains to proximity sensors having one or more transducers to emit an ultrasonic signal into, and to detect a reflected signal from, a local environment, e.g., of an audio appliance or an associated accessory.

BACKGROUND INFORMATION

Media devices can communicate an audio signal to one or more audio accessories to playback audio. For example, a media device can communicate audio to one or more in-ear earphones to be worn by a user during playback, or the media device can communicate the audio to another loudspeaker. Perceived sound quality and other measures of performance for an audio accessory can vary in correspondence with a local environment in which the audio accessory is placed. For example, perceived sound quality can deteriorate if an in-ear earphone is not well-seated in a user's ear.

SUMMARY

Disclosed ultrasonic proximity sensors, when calibrated, can classify a local environment, in part, based on observations of reflected ultrasonic signals. An audio accessory can incorporate an ultrasonic proximity sensor, and the sensor can be used to automatically determine whether or to what extent the audio accessory may be positioned to provide a desired level of performance. As but one example, an in-ear earphone can include such a sensor to determine whether the earphone is properly or suitably positioned in a user's ear. Moreover, disclosed sensors can be incorporated in an earphone or other housing having a continuous (e.g., non-perforated or a micro-perforated) external surface. A continuous, non-perforated surface can provide a "clean," uninterrupted aesthetic, which some may consider to be pleasing.

Concepts, systems, methods, and apparatus disclosed herein overcome many problems in the prior art and address one or more of the aforementioned or other needs.

According to one aspect, an audio device includes a housing wall defining an external surface to acoustically couple with a local environment. An internal surface is positioned opposite the external surface. A proximity sensor includes an ultrasonic transducer acoustically coupled with the internal surface of the housing wall to emit and/or to receive an ultrasonic signal.

The proximity sensor can be configured to determine whether a user is wearing the audio device. In some instances, the ultrasonic transducer includes a piezoelectric actuator to emit and/or to receive the ultrasonic signal. The piezoelectric actuator can be a first piezoelectric actuator to emit the ultrasonic signal. The ultrasonic transducer can include a second piezoelectric actuator to receive ultrasonic energy.

In some audio devices, the ultrasonic transducer is a first ultrasonic transducer positioned to define a first sensitive region of the housing wall. Such an audio device can also include a second ultrasonic transducer acoustically coupled with the housing wall. The second ultrasonic transducer can be so positioned relative to the first ultrasonic transducer as to define a second sensitive region of the housing wall.

The proximity sensor can be a first proximity sensor, and the audio device can include a second proximity sensor. The second proximity sensor can be an ultrasonic environment sensor or another (e.g., infrared) type of proximity sensor.

The ultrasonic transducer can include a piezoelectric actuator mounted to the internal surface of the housing wall. The piezoelectric actuator can be a first piezoelectric actuator, and the ultrasonic transducer can include a second piezoelectric actuator mounted to the internal surface of the housing wall to define a bistatic ultrasonic transducer.

The ultrasonic transducer can include an ultrasonic module mounted to the internal surface of the housing wall. The ultrasonic module can include a housing mounted to the internal surface of the housing wall. A piezoelectric actuator can be positioned in the housing. A mechanical coupler can physically couple the piezoelectric actuator with the housing. The mechanical coupler can clamp the piezoelectric actuator along a vibration node or along a periphery of the actuator.

The housing mounted to the internal surface of the housing wall and the piezoelectric actuator can define respective boundaries of an acoustic chamber in the ultrasonic module. The housing can define one or more acoustic ports opening to the acoustic chamber to define a Helmholtz resonator.

According to another aspect, an audio system is disclosed. The audio system can include a media device having a processor and a memory. An audio accessory can be communicatively coupleable with the media device. An ultrasonic proximity sensor can be configured to determine whether or to what extent a user has donned the audio accessory. The memory can contain instructions that, when executed by the processor, cause the media device to communicatively decouple from the audio accessory responsive to a determination by the ultrasonic proximity sensor that the user has not donned audio accessory.

The ultrasonic proximity sensor can include an ultrasonic transducer configured to emit an ultrasonic signal from the audio accessory into a corresponding environment. The ultrasonic transducer can also be configured to receive an ultrasonic signal from the corresponding environment.

In some instances, the ultrasonic transducer can be a first ultrasonic transducer. The proximity sensor can also include a second ultrasonic transducer configured to receive an ultrasonic signal from the corresponding environment.

The ultrasonic transducer can include a piezoelectric actuator to emit the ultrasonic signal.

Also disclosed are associated methods, as well as tangible, non-transitory computer-readable media including computer executable instructions that, when executed, cause a computing environment to implement one or more methods disclosed herein. Digital signal processors embodied in software, firmware, or hardware and being suitable for implementing such instructions also are disclosed.

The foregoing and other features and advantages will become more apparent from the following detailed description, which proceeds with reference to the accompanying drawings.

BRIEF DESCRIPTION OF THE DRAWINGS

Referring to the drawings, wherein like numerals refer to like parts throughout the several views and this specification, aspects of presently disclosed principles are illustrated by way of example, and not by way of limitation.

FIG. 3 schematically illustrates anatomy of a typical human ear.

FIG. 4 schematically illustrates an in-ear earphone positioned in the human ear shown in FIG. 3.

FIG. 5 illustrates a block diagram of a method to classify a local environment.

FIGS. 14, 15, 16, and 17 schematically illustrate respective modular piezoelectric actuators mounted to an internal surface of an enclosure for an audio accessory of the type shown in FIG. 2.

DETAILED DESCRIPTION

Figure 1:
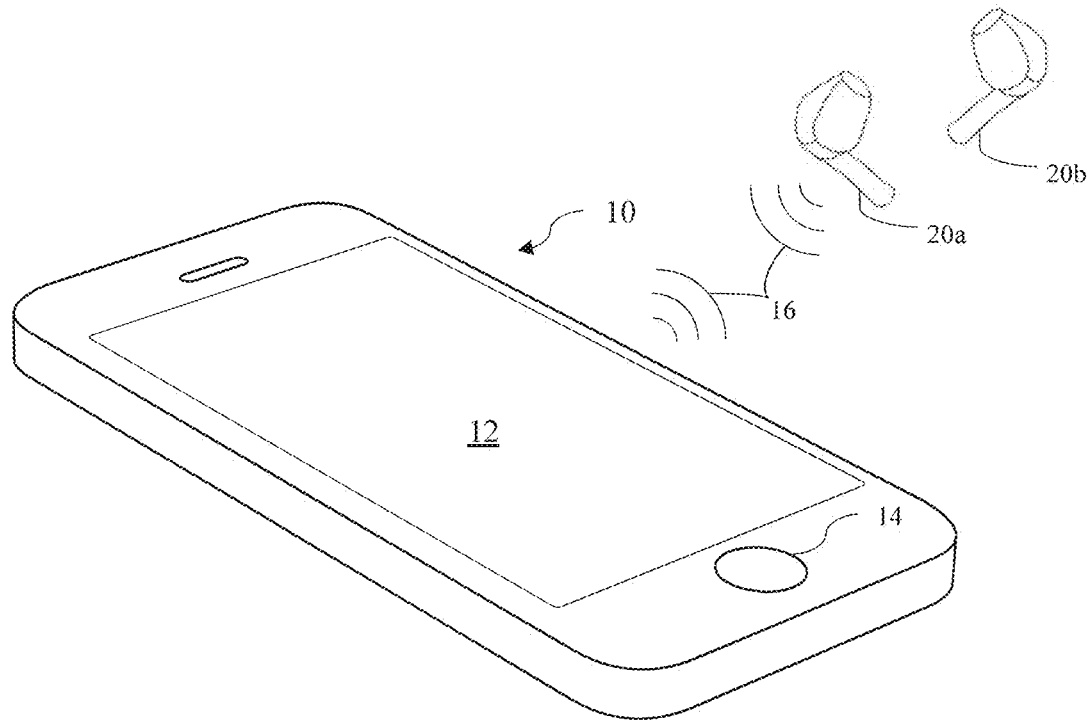
FIG. 1 illustrates a media device and an associated audio accessory.

The following describes various principles related to ultrasonic proximity sensors, and related systems and methods. For example, some disclosed principles pertain to systems, methods, and components to emit an ultrasonic signal into, and to detect a reflected signal from, a local environment, e.g., of an audio appliance. As but one illustrative example, an in-ear earphone has one or more transducers to emit an ultrasonic signal externally of the earphone and to receive an ultrasonic signal, e.g., reflected by a user's ear, to determine whether and/or how well the earphone may be positioned in a user's ear. That said, descriptions herein of specific appliance, apparatus or system configurations, and specific combinations of method acts, are but particular examples of contemplated sensors, components, appliances, systems, and methods chosen as being convenient illustrative examples of disclosed principles. One or more of the disclosed principles can be incorporated in various other sensors, components, appliances, systems, and methods to achieve any of a variety of corresponding, desired characteristics. Thus, a person of ordinary skill in the art, following a review of this disclosure, will appreciate that sensors, components, appliances, systems, and methods having attributes that are different from those specific examples discussed herein can embody one or more presently disclosed principles, and can be used in applications not described herein in detail. Such alternative embodiments also fall within the scope of this disclosure.

I. Overview

An in-ear earphone can automatically detect whether or to what extent it is positioned in a user's ear and can enable any of a variety of functions in an associated device. For example, the earphone can communicate its status to a media player or other computing environment. When the status indicates the earphone is being worn, the media player or other computing environment can transmit, for example, an audio signal to the earphone and the earphone can decode and playback the audio signal for the user. When the status indicates the earphone is not being worn, the media player can stop transmitting the audio signal to the earphone and, by way of example, instead redirect the audio signal to another playback device, or altogether pause or stop media playback. As well, when an earphone detects that it is not being worn, the earphone can power down or enter a sleep state to preserve battery charge.

Because the earbud portion of the earphone sits at least partially within the ear canal of a user during use, an external surface of the earbud generally contacts various portions of the ear to help keep it positioned within the ear of a user. However, perceived sound quality emitted by an in-ear earphone can deteriorate when an earphone is misaligned with a user's ear. An earphone that can detect whether or to what extent is it aligned with a user's ear can take one or more remedial steps when misalignment or removal is detected (e.g., by alerting a user of a misaligned earphone, powering down the earphone, communicating the earphone's status to a media player).

A measure of alignment of an earphone relative to a user's ear can correspond to a measure of contact between one or more regions on the external surface of the housing and one or more corresponding regions of a user's ear. For instance, an in-ear earphone can be considered to be misaligned if at least one external region, for example, two external regions, of an earphone housing are not seated against, or not well seated against, a corresponding region of a wearer's ear anatomy. In one example, if an external surface of an earphone housing is not well seated against, e.g., a user's concha cavum, the earphone may be considered as being misaligned relative to the user's ear. Alternatively, if a first region of the earphone is not well seated against the user's tragus and a second region of the earphone is not well seated against the user's anti-tragus, the earphone may be considered as being misaligned.

An proximity sensor, all or a portion of which can be positioned in the earbud, can detect whether or to what extent the earbud is positioned in a user's ear and is ready to be used for media playback. For example, the proximity sensor can discern differences between being positioned in or near a user's ear, as compared to being carried in a carrying case or a pocket, or resting on a table. More particularly, but not exclusively, one or more ultrasonic transducers can be positioned in an earphone housing to define one or more corresponding sensitive regions of the housing. Each sensitive region can detect whether the corresponding region of the earphone housing urges against, for example, a user's ear.

II. Media Devices

FIG. 1 shows a portable media device 10 suitable for use with a variety of accessory devices. The portable media device 10 can include a touch sensitive display 12 configured to provide a touch sensitive user interface for controlling the portable media device 10 and in some embodiments any accessories to which the portable media device 10 is electrically or wirelessly coupled. For example, the media device 10 can include a mechanical button 14, a tactile/haptic button, or variations thereof, or any other suitable ways for navigating on the device. The portable media device 10 can also include a communication connection, e.g., one or more hard-wired input/output (I/O) ports that can include a digital I/O port and/or an analog I/O port, or a wireless communication connection.

An accessory device can take the form of an audio device that includes two separate earbuds 20a and 20b. Each of the earbuds 20a and 20b can include wireless receivers, transmitters or transceivers capable of establishing a wireless link 16 with the portable media device 10 and/or with each other. Alternatively and not shown in FIG. 1, the accessory device can take the form of a wired or tethered audio device that includes separate earbuds. Such wired earbuds can be electrically coupled to each other and/or to a connector plug by a number of wires. The connector plug can matingly engage with one or more of the I/O ports and establish a communication link over the wire and between the media device and the accessory. In some wired embodiments, power and/or selected communications can be carried by the one or more wires and selected communications can be carried wirelessly.

III. In-Ear Earphones

Figure 2:
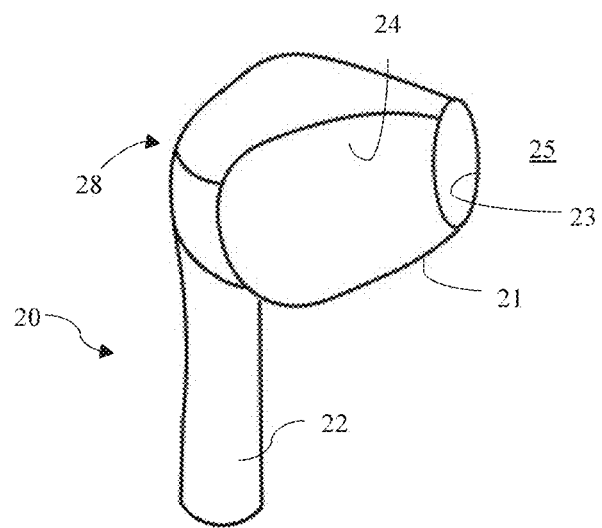
FIG. 2 illustrates an isometric view of a housing for an in-ear earphone.

FIG. 2 shows an earbud housing 20 configured to operatively engage with common anatomy of a human ear when being worn by a user, and FIG. 3 illustrates such anatomy 30 schematically. FIG. 4 shows the earbud housing 20 positioned within an ear 30 of a user during use. As depicted among FIGS. 2, 3 and 4, the earbud housing 20 defines a major medial surface 24 that faces the surface of the user's concha cavum 33 when the housing 20 is properly seated in a user's ear 30.

For example, when properly positioned in a user's ear 30, the earphone housing 20 can rest in the user's concha cavum 33 between the user's tragus 36 and anti-tragus 37, as in FIG. 4. An external surface of the housing, e.g., the major medial surface 24, can be complementarily contoured relative to, for example, the user's concha cavum 33 (or other anatomy) to provide a contact region 43 (FIG. 4) between the contoured external surface and the user's skin when the earphone is properly positioned. The contact region 43 can span a major portion of the contoured external surface 24. Those of ordinary skill in the art will understand and appreciate that, although the complementarily contoured external surface 24 is described in relation to the concha cavum 33, other external regions of an earphone housing 20 can be complementarily contoured relative to another region of a human ear 30. For example, the housing 20 defines a major bottom surface 21 that generally rests against the region of the user's ear between the anti-tragus 37 and the concha cavum 33 to define a contact region 42. Still other contact regions are possible.

The housing 20 also defines a major lateral surface 28 from which a post 22 extends. The post 22 can include a microphone transducer and/or other component(s) such as a battery. Alternatively, in context of a wired earbud, one or more wires can extend from the post 22. When the earbud is properly donned, as in FIG. 4, the post 22 extends generally parallel to a plane defined by the user's earlobe 39 at a position laterally outward of a gap 38 between the user's tragus 36 and anti-tragus 37.

Further, the earbud defines an acoustic port 23. The port 23 provides an acoustic pathway from an interior region of the housing 20 to an exterior 25 of the housing. As shown in FIG. 4, the port 23 aligns with and opens to the user's ear canal 31 when the earbud is properly donned as described above. A mesh, screen, film, or other protective barrier (not shown) can extend across the port 23 to inhibit or prevent intrusion of debris into the interior of the housing.

In some earbuds, the housing 20 defines a boss or other protrusion from which the port 23 opens. The boss or other protrusion can extend into the ear canal 31 and can contact the walls of the canal over a contact region 41. Alternatively, the boss or other protrusion can provide a structure to which a resiliently flexible cover (not shown) such as, for example, a silicone cover, can attach to provide an intermediate structure forming a sealing engagement between the walls of the user's ear canal 31 and the housing 20 over the contact region 41. The sealing engagement can enhance perceived sound quality, as by passively attenuating external noise and inhibiting a loss of sound power from the earbud.

Although not specifically shown, the housing 20 also can include a compliant member to conform to person-to-person variations in contour among the tragus 36, anti-tragus 37, and concha cavum 33. For example, a compliant member can matingly engage with a region of the housing 20 corresponding to the major surface 24. Such a compliant member (not shown) can accommodate a certain amount of compression that allows secure seating of housing 20 within the ear 30 of the user, e.g., within the concha cavum 33.

The housing 20 can be formed of any material or combination of materials suitable for earphones. For example, some housings are formed of acrylonitrile butadiene styrene (ABS). Other representative materials include polycarbonates, acrylics, methacrylates, epoxies, and the like. A compliant member can be formed of, for example, polymers of silicone, latex, and the like.

FIG. 4 also depicts several regions of contact between the earphone housing 20 and tissue of the user's ear 30. Each region 41, 42, 43 defines an area on the surface of the housing 20, or surface of an intermediate compliant member, that urges against the user's tissue.

Proximity sensor or portion thereof can be positioned within the housing 20 at a position opposite a selected contact region 41, 42, 43 relative to the housing wall. For example, a proximity sensor, or a transmitter and/or receiver thereof, can be positioned in the housing 20 opposite a contact region 41, 42, 43 (or other intended contact region) to define a corresponding sensitive region of the earphone housing. Each respective sensor can assess whether or to what extent the corresponding contact region 41, 42, 43, and thus the housing 20, is aligned in the user's ear.

Further, physical characteristics of a local environment can influence a degree to which an emitted signal may reflect and/or be damped as it passes through the environment. For example, ultrasonic energy may dissipate much more quickly through air or a textile (or other material having a high attenuation coefficient over a frequency range of interest) as compared to water or human tissue. In addition, a reflection of an emitted ultrasonic signal that passes through air or a textile may be much more attenuated when received by the receiver compared to a reflection of an ultrasonic signal that passes through water or human tissue. As well, a reflection of an emitted ultrasonic signal that passes through a dry interface between a given sensor and a given tissue may be much more attenuated when received by the receiver compared to a reflection of an ultrasonic signal that passes through an interface having an acoustic couplant between the sensor and the tissue. If the transducer is positioned to emit the signal into, for example, a user's tissue or other substance, the tissue or other substance can reflect the signal and the reflected signal can be received by the sensor or a component thereof. Accordingly, reflections received by the sensor can indicate when a user's tissue (e.g., a user's ear) is positioned in close proximity to the sensor. Some disclosed proximity sensors can detect characteristics of a local environment through a solid (e.g., non-perforated) housing wall to provide an uninterrupted external surface and an aesthetically pleasing appearance to the housing. Nonetheless, some housing walls may have a plurality of visibly indistinguishable perforations (sometimes referred to as "micro-perforations").

Some earphones define a single sensitive region corresponding to one selected contact region. When the sensitive region is adjacent or immersed in air or a textile, for example, emitted ultrasonic signals may dissipate and reflections might not be received. Accordingly, the underlying proximity sensor can determine that the earbud is not being worn and can emit a corresponding signal to the media device 10. However, when the sensitive region is adjacent or in contact with, for example, a table or a shelf, the underlying proximity sensor may receive a reflection of an emitted ultrasonic signal and determine (in this example incorrectly) that the earbud is being worn.

To avoid a false indication that an earbud is being worn, some earphones incorporate a plurality of proximity sensors or transducers to define a corresponding plurality of sensitive regions on the earbud housing 20. The plurality of sensitive regions can be spaced apart from each other, for example, so no two sensitive regions can contact a flat surface (e.g., a shelf or a desk) when the earbud housing 20 rests on the flat surface. For example, if transducers are arranged to make the contact regions 41 and 43 sensitive, both contact regions will not simultaneously contact a flat surface on which the earbud housing 20 rests. Thus, both regions will not indicate the earbud is being worn when the earbud housing 20 rests on a flat surface. The underlying sensor can be configured to determine the earbud housing is being worn only when two or more of the sensitive regions receive reflected ultrasonic signals. Otherwise, the sensor can indicate that the earphone is not being worn.

IV. Ultrasonic Proximity Sensors: Overview

FIG. 5 illustrates a general approach 50 for determining a local environment for an in-ear earphone. At block 52, a proximity sensor, such as a sensor in an earbud housing, can emit an acoustic signal in an ultrasonic frequency band. The signal can be emitted at a single frequency or over a plurality of frequencies.

Figure 6:
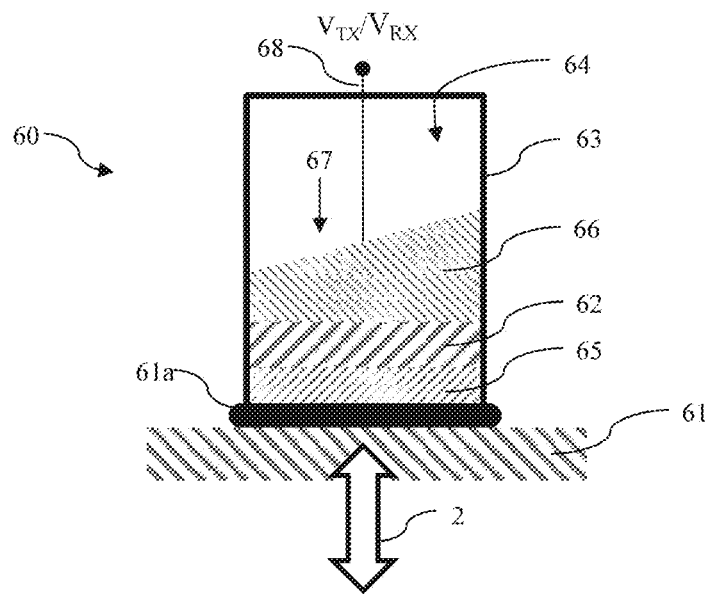
FIG. 6 schematically illustrates a modular, monostatic, ultrasonic proximity sensor.
Figure 7:
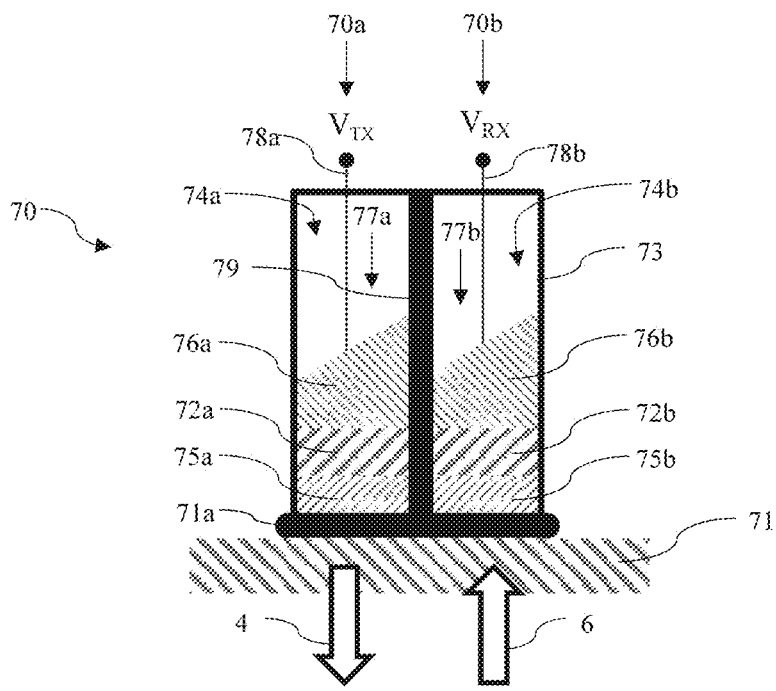
FIG. 7 schematically illustrates a modular, bistatic, ultrasonic proximity sensor.

As shown schematically in FIGS. 6 and 7, a sensor can have an ultrasonic transducer 60, 70a to emit the acoustic signal 2, 4 (sometimes referred to as a "transmitter") into a local medium 61, 71 and an ultrasonic transducer 60, 70b to receive an acoustic signal 2, 6 (sometimes referred to as a "receiver") from the medium. Ultrasonic proximity sensors can have a monostatic configuration 60 (FIG. 6) or a bistatic configuration 70 (FIG. 7). Each transmitter can be activated with an incoming signal over a conductor 68, 78a.

With a monostatic transducer 60 as depicted in FIG. 6, the transducer acts as a transmitter and a receiver. Stated differently, the same acoustic diaphragm 62 emits and receives acoustic energy 2. Consequently, the monostatic transducer 60 emits an ultrasonic signal for a selected duration and subsequently awaits reflections of the signal so the sensor can ascertain characteristics of the local environment 61. A diaphragm suitable to efficiently emit high intensity (e.g., sound-pressure level) acoustic signals may be relatively insensitive to received acoustic energy. Similarly, a diaphragm with high sensitivity to receive even relatively weak acoustic signals may be relatively inefficient and/or incapable of emitting high intensity acoustic signals. Consequently, a diaphragm that is neither an ideal transmitter nor an ideal receiver, but rather a suitable transmitter and a suitable receiver, can be used in monostatic proximity sensor. Nonetheless, by virtue of having a single diaphragm 62, a monostatic configuration 60 may occupy relatively less space than a bistatic configuration 70.

In contrast, a bistatic configuration 70 (FIG. 7) uses a first electro-acoustic transducer 72a to emit acoustic energy 4 (the transmitter) into the local medium 71 and a second electro-acoustic transducer 72b to receive acoustic energy 6 (the receiver) from the medium. Consequently, a bistatic configuration 70 lends itself to using a hard or stiff material for the diaphragm 72a of the transmitter 70a and a soft or flexible material for the diaphragm 72b of the receiver 70b. The transmitter 72a and the receiver 72b can be acoustically separated from each other, as by an isolation member 79, to inhibit cross-talk between the transducers 70a, 70b.

Regardless of whether a sensor has a monostatic configuration or a bistatic configuration, the corresponding ultrasonic transducer can have a resonant frequency above an upper threshold frequency of human hearing. Often, the upper threshold of human hearing is assumed to be about 20 kHz, though some individuals can hear modestly higher frequencies and the upper threshold frequency often falls with age. Some ultrasonic transducers emit acoustic energy at a frequency well above the assumed threshold of human hearing. For example, some ultrasonic transducers emit acoustic energy at a frequency greater than about 40 kHz, such as, for example, greater than about 42 kHz, or greater than about 45 kHz. The sensor can emit an acoustic signal that includes a resonant frequency of the transducer.

At block 54, the sensor receives one or more ultrasonic signals. Each transducer 60, 70 can emit a signal indicative of a received ultrasonic signal over a conductor 68, 78b.

More particularly, an acoustic signal received by the receiver 60, 70b may originate with the transmitter 60, 70a and be reflected to the receiver by a local medium 61, 71. A reflection of the emitted signal can correlate with the emitted signal, albeit possibly with a shift in phase and/or a lower amplitude due to damping of the emitted signal and the reflected signal by a local environment 61, 71. On the other hand, an acoustic signal received by the receiver may originate from a source other than the transmitter, in which case the received signal would not correlate with a signal emitted by the sensor's transmitter. Accordingly, correlation between an emitted signal and a received signal can indicate that the received signal constitutes a reflected portion of the emitted signal. At block 56 in FIG. 5, a degree of correlation between the emitted signal and the received signal is assessed, so as to determine whether the received signal constitutes a reflection of the emitted signal.

Further, reflections of one or more ultrasonic signals can be characterized or calibrated using a variety of measures and across a variety of local environments. For example, variation in magnitude- and/or phase-spectra of reflected ultrasonic signals can be characterized and recorded for each of a variety of parameters. As described more fully below, such parameters include, for example, surrounding material, conditions of an interface between the local surroundings and the sensor or an associated member, configuration of a local surroundings, arrangement of a proximity sensor relative to the local surroundings, and variations thereof.

Exemplary surrounding materials include, by way of example, air, textiles, clothing, water, and/or various types of tissue, such as, for example, skin, cartilage, fascia, and bone. Exemplary conditions of an interface between the local surroundings and the sensor or an associated member include, for example, a dry interface between a sensor housing and a user's skin, a couplant-augmented interface between the sensor housing and the user's skin, and/or a compressed interface. Exemplary arrangements of a local surroundings include typical arrangements include a supporting flat surface in open air, pants-pockets, typical anatomical arrangements (e.g., concha cavum, tragus, antitragus), and variations thereof (e.g., air at various temperatures, clothing of different types and materials). As another example, magnitude and/or phase spectra of reflected ultrasonic signals can be characterized and recorded over a range of coupling conditions between the sensor and one or more local surroundings. Such coupling conditions can include, for example, "good" contact between a sensor housing and a selected region of a user's ear, "loose" contact between the sensor housing and the selected region of the user's ear, "good" alignment of an earphone with a selected portion of the user's ear, "poor" alignment of the earphone with the selected portion of the user's ear, etc.

After being characterized or calibrated across a variety of environments of interest, a proximity sensor can be used in situ to infer information about an unknown local environment (e.g., surrounding material, conditions of an interface between the local surroundings and the sensor or an associated member, configuration of a local surroundings, arrangement of a proximity sensor relative to the local surroundings, and variations thereof). For example, a calibrated proximity sensor can, in situ, emit an acoustic signal over an ultrasonic frequency band to a local environment and observe a magnitude- and/or a phase-spectra of reflections or other received ultrasonic signals. To the extent observed magnitude- and/or phase-spectra of a received ultrasonic signal correlate with the emitted acoustic signal, the sensor can infer that the received ultrasonic signal constitutes a reflection of the emitted signal. Moreover, a match between the observed magnitude- and/or phase-spectra of the unknown environment and a magnitude- and/or phase-spectra of a characterized environment can indicate that the unknown local environment is substantially similar to the characterized environment. Moreover, the sensor can incorporate signals from spaced apart transducers and infer that an earbud is in contact with, for example, a user's ear only when more than one sensor detects a local surroundings other than air, for example. Thus, as indicated at block 58, the proximity sensor can determine or classify a local environment in which it rests or is being used.

By way of illustration, sensors having piezoelectric transducers suitable to emit and to receive ultrasonic acoustic energy are described in relation to FIGS. 6 and 7. As used herein, the term "piezoelectric transducer" generally refers to a device that converts an electrical charge (or current) to mechanical motion or vice-versa using piezoelectric material. In turn, the term "piezoelectric material," as used herein, refers to a material that exhibits an electromechanical interaction, as by generating an electrical charge (or current or potential) responsive to a mechanical force or deformation applied to the material and/or by exerting a mechanical force or deforming responsive to an electrical charge (or current or potential) applied to the material. By way of example, piezoelectric materials include naturally occurring crystalline materials (e.g., Quartz, Berlinite ($AlPO_4$), Sucrose, Rochelle salt, Topaz, Tourmaline-group minerals, and Lead titanate ($PbTiO_3$)), certain biological materials, synthetic crystalline structures (e.g., Langasite ($La_3Ga_5SiO_{14}$), Gallium orthophosphate ($GaPO_4$), Lithium niobate ($LiNbO_3$) Lithium tantalate ($LiTaO_3$)), certain ceramic materials (e.g., Barium titanate ($BaTiO_3$), Lead zirconate titanate ($Pb[Zr_xTi_{1-x}]O_3$ with $0 \leq x \leq 1$, and commonly referred to in the art as "PZT"), Potassium niobate ($KNbO_3$), Sodium tungstate ($Na_2WO_3$), $Ba_2NaNb_5O_5$, $Pb_2KNb_5O_{15}$, and single-crystal Zinc oxide (ZnO), Sodium potassium niobate ($(K,Na)NbO_3$), Bismuth ferrite ($BiFeO_3$), Sodium niobate ($NaNbO_3$), Bismuth titanate ($Bi_4Ti_3O_{12}$), Sodium bismuth titanate ($NaBi(TiO_3)_2$), Group III-V and Group II-VI semiconductors (e.g., wurtzite structures of GaN, InN, AlN), certain polymers (e.g., Polyvinylidene fluoride (PVDF)), and certain organic nanostructures (e.g., diphenylalanine peptide nanotubes, sometimes referred to as "PNTs"). Hard, stiff ceramics, such as, for example, PZT-4H can provide a correspondingly high drive intensity (sound pressure level) compared to a softer, more flexible ceramic, such as, for example, PZT-5H. Hard, stiff materials can be suitable for transmitters and soft, more flexible materials can provide higher sensitivity and be suited for receivers.

Referring again to FIGS. 6 and 7, the piezoelectric transducers 60, 70 can be coupled with or mounted on an internal surface of the earbud housing. The transducers 60, 70 have a respective piezoelectric diaphragm 62, 72a, 72b positioned within a corresponding housing, or enclosure 63, 73, defining respective open interior chambers 64, 74a, 74b.

A piezoelectric transducer 60, 70 can include a piezoelectric diaphragm 62, 72a, 72b laminated between a respective so-called "matching layer" 65, 75a, 75b and a respective damper 66, 76a, 76b. As shown in FIGS. 6 and 7, the damper (e.g., a damping material) 66, 76a, 76b can be laminated with the diaphragm 62, 72a, 72b on a side opposite the matching layer 65, 75a, 75b relative to the diaphragm.

Each damper 66, 76a, 76b can reduce reverberation in the open interior chamber cavity 64, 74a, 74b and improve the sensor's corresponding spatial resolution. In one aspect, a face 67, 77a, 77b of the damper 66, 76a, 76b can be sloped (e.g., oriented in a non-parallel fashion) relative to an interior surface of the housing 63, 73. Such an orientation can inhibit formation of standing waves and/or other resonance effects that can arise when an acoustic radiator emits waves orthogonally toward a housing wall.

Each matching layer 65, 75a, 75b can be formed of one or more materials having a desired combination of characteristics, such as, for example, an acoustic impedance that approximates an acoustic impedance of a housing material and/or a likely or a desired surroundings material. For example, tissue of a user's ear can have a specific acoustic impedance of about 1.5 MRayls (e.g., between about 1.4 MRayls and about 1.6 MRayls), and ABS can have a specific acoustic impedance of about 2.3 MRayls (e.g., between about 2.2 MRayls and about 2.4 MRayls). Reducing a number and/or a magnitude of discontinuities in acoustic impedance between the diaphragm 62, 72a, 72b and a likely or a desired environment 61, 71 into which the ultrasonic signal may be emitted can reduce or eliminate internal reflections arising from an impedance mismatch between the respective transducer 60, 70 and the environment. Such internal reflections, if not eliminated or inhibited with a matching layer 65, 75a, 75b or filtered from the output of the receiver 78b, can introduce errors in the sensor, as by falsely indicating a presence of a desired environment.

Acoustic coupling between the transducers 60, 70 and a corresponding local environment 61, 71 can be enhanced by placing an acoustic couplant 61a, 71a between a surface of the local environment 61, 71 and the respective transducer. For example, the couplant can fill interstitial gaps between a surface of the transducer and a user's skin.

Electro-acoustic transducers having a large lateral dimension, w, relative to an emitted wavelength, $\lambda$, (e.g., w>>$\lambda$) can provide a high degree of directionality, or a low-degree of divergence. When used as a receiver, such transducers can be highly sensitive to orientation relative to incoming acoustic waves. On the other hand, transducers having a lateral dimension on the order of the wavelength (e.g., w~$\lambda$) tend to be less directional and tend to emit (or receive) acoustic waves over a relatively wider range of angles compared to transducers with a larger lateral dimension.

V Ultrasonic Proximity Sensors: Direct Integration

Other configurations for a proximity sensor are possible. For example, a piezoelectric diaphragm (or another actuator) can be mounted to an earbud housing. Deformation of the diaphragm or other actuator can interact with the earbud housing 20 to emit an ultrasonic signal. Similarly, interaction between the earbud housing 20 and a diaphragm responsive to an incoming ultrasonic signal can deform the diaphragm or other actuator and generate an electrical signal.

Figure 8:
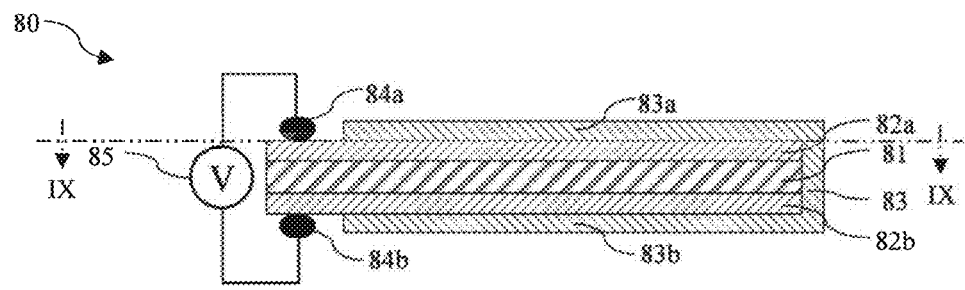
FIG. 8 schematically illustrates a side elevation of a cross-section of a rectangular, piezoelectric actuator taken along line VIII-VIII in FIG. 9.
Figure 9:
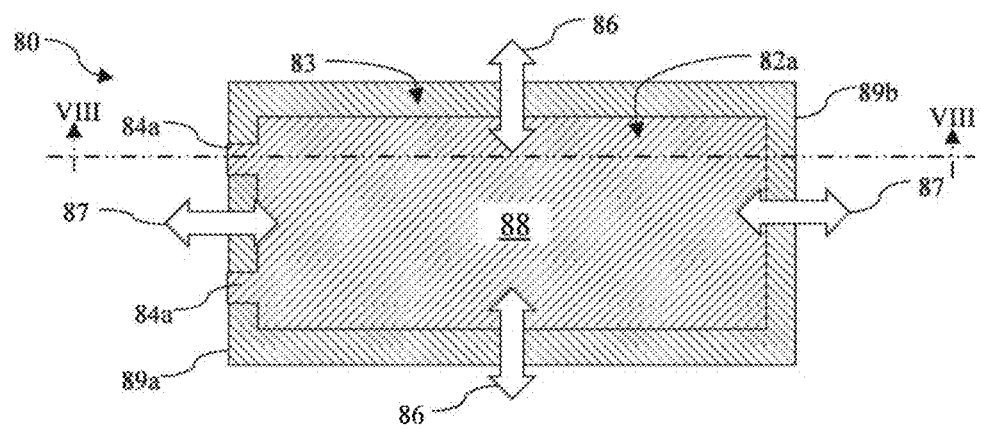
FIG. 9 schematically illustrates plan view from above a rectangular, piezoelectric actuator taken along line IX-IX in FIG. 8.

Referring now to FIGS. 8 and 9, a piezoelectric actuator 80 suitable for directly coupling to an earbud housing 20 will be described. In FIG. 8, a layer of piezoelectric material 81 is laminated between opposed, electrically conductive layers 82a, 82b. A flexible, insulative coating 83, 83a, 83b can encapsulate or otherwise cover at least a portion of one or both electrode layers 82a, 82b outward of the piezoelectric material. By way of example, the coating 83, 83a, 83b can be formed of polyimide or another flexible, insulative material. One or more regions of the electrically conductive layers (or a region of another electrical conductor electrically coupled with the electrically conductive layers) 82a, 82b can be exposed to define corresponding electrodes 84a, 84b.

A voltage potential 85 applied across the electrodes 84a, 84b, and thus across the piezoelectric material by virtue of the electrically conductive layers 82a, 82b can cause the piezoelectric material 81 to deform, as indicated by the arrows 86, 87. As the voltage potential 85 varies, e.g., at a selected frequency, the piezoelectric material 81 can deform at a corresponding frequency.

Figure 10:
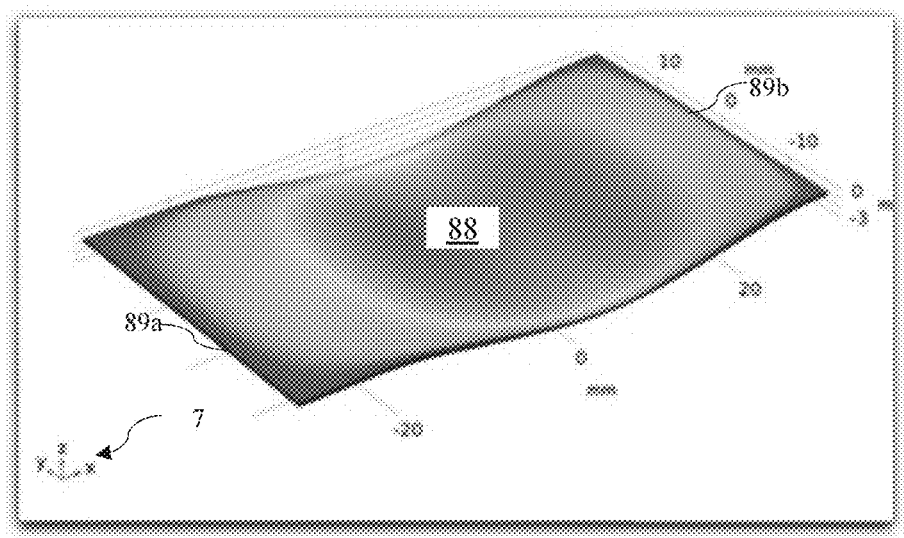
FIG. 10 illustrates a plot of deflection for a rectangular piezoelectric actuator of the type shown in FIGS. 8 and 9.
Figure 11:
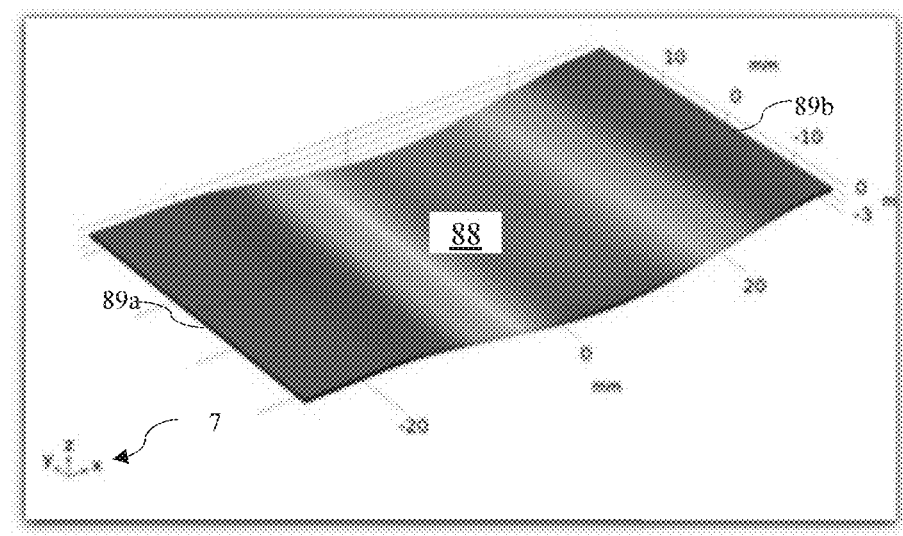
FIG. 11 illustrates a plot of sound pressure level output for a rectangular piezoelectric actuator of the type shown in FIGS. 8 and 9.

FIG. 10 shows a plot of deformation of the piezoelectric actuator 80 relative to the coordinate axes 7. As shown in FIG. 10, a central region 88 of the actuator 80 undergoes a substantially larger deformation along the z-axis (e.g., in a direction orthogonal to the actuator) compared to edge regions 89a, 89b. FIG. 11 shows a plot of acoustic energy emitted by the actuator 80. Consistent with the magnitude of deformation shown in FIG. 10, the central region 88 emits substantially more acoustic energy than the edge regions 89a, 89b.

A piezoelectric actuator can be affixed to an earbud housing in a monostatic (FIG. 12) configuration or in a bistatic (FIG. 13) configuration.

Figure 12:
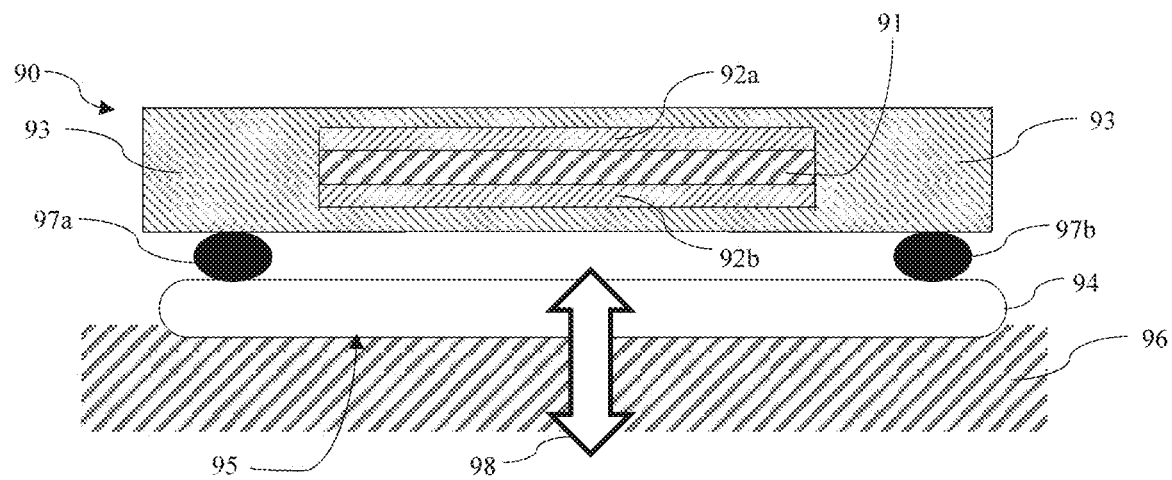
FIG. 12 schematically illustrates a monostatic piezoelectric actuator mounted to an internal surface of an enclosure for an audio accessory of the type shown in FIG. 2 to form a monostatic, ultrasonic transducer.

In FIG. 12, an ultrasonic actuator 90 includes a layer of piezoelectric material 91 positioned between opposed layers 92a, 92b of electrically conductive material. A flexible coating covers the laminated layers 92a, 91, 92b, generally as described above in relation to FIGS. 8 and 9. The actuator 90 is mounted to an internal surface of an earbud housing 94. The internal surface of the housing 94 is positioned opposite an external surface 95 of the housing to be placed in contact with a local material 96. The external surface 95 defines a sensitive region of the earbud. Couplers 97a, 97b can include any suitable form of attachment between the actuator 90 and the housing 94, such as, for example, an adhesive, an epoxy, and a mechanical engagement. The actuator 90 can be deformed in a time-varying manner, as by passing a varying electrical current or a varying electrical potential across the conductive layers 92a, 92b. The mechanical attachment between the actuator 90 and the housing 94 can cause the housing to deform in correspondence with deformations of the actuator 90. The combined deformations of the housing 94 and the actuator 90 can emit an ultrasonic signal 98 into the local environment 96. Alternatively, an incoming ultrasonic signal 98 (e.g., a reflection of an emitted ultrasonic signal) can cause the housing 94 and thus the actuator 90 to deform. Deformation of the actuator 90 can induce the piezoelectric material 91 to generate an electrical signal in (e.g., a voltage potential or an electrical current across) the conductive layers 92a, 92b. A processing unit of the sensor (including an analog-to-digital converter) can receive and process the electrical signal to assess whether or to what extent the housing 94 is in sufficient contact with a desired environment.

Figure 13:
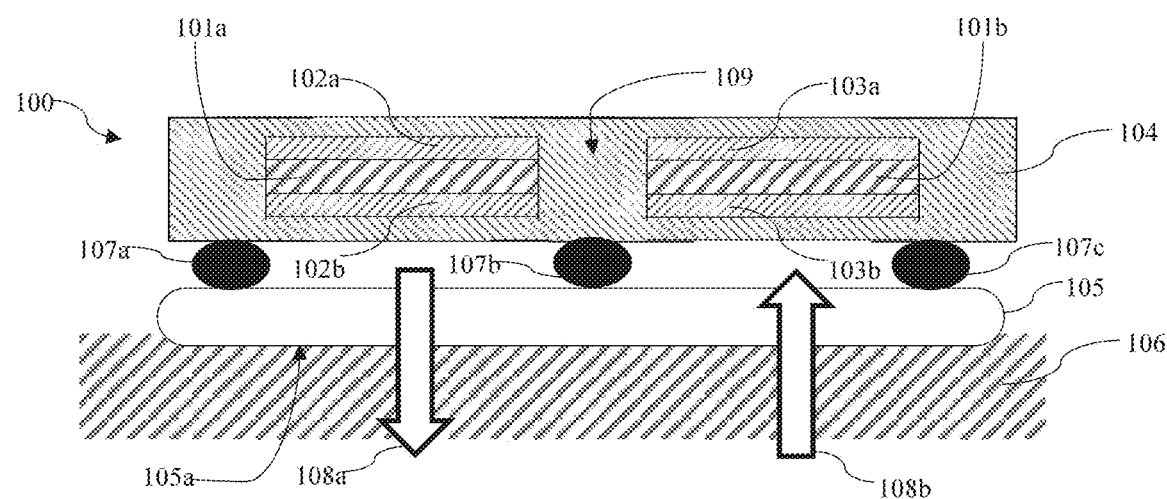
FIG. 13 schematically illustrates a bistatic piezoelectric actuator mounted to an internal surface of an enclosure for an audio accessory of the type shown in FIG. 2 to form a bistatic, ultrasonic transducer.

In FIG. 13, an ultrasonic actuator 100 includes a first layer of piezoelectric material 101a (a transmitter) and a second layer of piezoelectric material 101b (a receiver). The first layer of piezoelectric material 101a is positioned between corresponding opposed layers 102a, 102b of electrically conductive material. The second layer of piezoelectric material 101b is positioned between corresponding opposed layers 103a, 103b of electrically conductive material. A flexible coating 104 covers the laminated layers 102a, 101a, 102b and the laminated layers 103a, 101b, 103b generally as described above in relation to FIGS. 8, 9, and 10, except that the coating 104 defines an acoustic isolation region 109 positioned between the laminated layers 102a, 101a, 102b and the laminated layers 103a, 101b, 103b. The actuator 100 is mounted to an internal surface of an earbud housing 105. The internal surface of the housing 105 is positioned opposite an external surface 105a of the housing in contact with a local material 106. The external surface 105a defines a sensitive region of the earbud. Couplers 107a, 107b, 107c can include any suitable form of attachment between the actuator 100 and the housing 105, such as, for example, an adhesive, an epoxy, and a mechanical engagement.

The transmitter-portion of the actuator 100 can be deformed in a time-varying manner, as by passing a varying electrical current or a varying electrical potential across the conductive layers 102a, 102b to cause the piezoelectric layer 101a to deform. The mechanical attachment between the actuator 100 and the housing 105 can cause the housing to deform in correspondence with deformations of the piezoelectric layer 101a. The combined deformations of the housing 105 and the piezoelectric layer 101a can emit an ultrasonic signal 108a into the local environment 106. An incoming ultrasonic signal 108b (e.g., a reflection of an emitted ultrasonic signal 108a) can cause the housing 105 and thus the piezoelectric layer 101b to deform. Deformation of the piezoelectric layer 101b can induce the piezoelectric material 101b to generate an electrical signal in (e.g., a voltage potential or an electrical current across) the conductive layers 103a, 103b. A processing unit of the sensor (including an analog-to-digital converter) can receive and process the electrical signal to assess whether or to what extent the housing 105 is in sufficient contact with a desired environment.

VI. Modular Ultrasonic Proximity Sensors

Modular ultrasonic transducers also are possible and are described in relation to FIGS. 14, 15, 16, and 17. The modular ultrasonic transducers can be configured as a monostatic transducer or as a bistatic transducer. Unlike a directly integrated transducer, modular ultrasonic transducers can be assembled and tested prior to being incorporated into an earbud.

Rather than directly integrating, e.g., a piezoelectric actuator with the earbud housing as in FIGS. 12 and 13, a modular ultrasonic transducer 110a, 110b, 110c, 110d can include a housing 111a, 111b, 111c, 111d in which a piezoelectric diaphragm 112a, 112b, 112c, 112d is mounted. The modular transducer 110a, 110b, 110c, 110d can be physically coupled with (e.g., mounted to, adhered to, or affixed on) an interior surface of an earbud housing 116. An opposed, external surface 117 of the earbud housing 116 can emit and be sensitive to ultrasonic signals, generally as described above.

The housing 111a, 111b, 111c, 111d and diaphragm 112a, 112b, 112c, 112d can define a resonant chamber 113a, 113b, 113c, 113d. Diaphragm excursions for a primary mode of each transducer 110a, 110b, 110c, 110d are shown by the dashed lines 115a, 115b, 115c, 115d.

As in FIG. 14, the diaphragm 112a can be clamped within the housing, as along a nodal line 114a along which the diaphragm does not oscillate. With a configuration as in FIG. 14, high amplitude and relatively low energy losses can be attained. Nonetheless, a portion of the diaphragm 112a positioned laterally or radially outward of the nodal line 114a vibrates out-of-phase relative to a portion positioned laterally or radially inward of the nodal line, giving rise to a potential for interference between the emissions of the inward and the outward portions.

Alternatively, as in FIG. 15, a circular diaphragm 112b can be clamped within the housing 111b along a circumference. The circumferentially clamped diaphragm 112b can vibrate at a frequency similar to that shown in FIG. 14. However, greater interaction between the housing 111b and the diaphragm 112b can dampen oscillations and result in a relatively larger loss of energy and lower amplitude than the configuration in FIG. 14. Additionally, the housing 111b may need to be more massive to accommodate increased mechanical loads compared to the arrangement in FIG. 14. Nonetheless, the entire diaphragm 112b largely vibrates in phase and thus the arrangement in FIG. 15 can be less susceptible to destructive interference from an anti-phase emission.

As another alternative, as in FIG. 16, a non-circular, e.g., a rectangular, diaphragm 112c can be edge clamped by the housing 111c. Consequently, angular deformations of the diaphragm 112c are possible and the corresponding resonant frequency is expected to be about one-half of that of the configurations in FIGS. 14 and 15.

As shown in FIG. 15, the enclosure wall that contacts the earbud housing wall 116 can be solid, as with the wall 118a. Alternatively, as shown in FIG. 17, the wall 118b can define one or more acoustic ports, making the resonant chamber 113d a Helmholtz resonator. Where a thickness of the earbud wall 116 is substantially less than a wavelength of an ultrasonic signal, interference by the wall 116 can be relatively small or insignificant. A resonant frequency, fr, of the chamber 113d can be approximated using the following relationship:

$$f_r = \frac{c}{2\pi}\sqrt{\frac{n\pi r^2}{v\left(l+\frac{\pi r^2}{2}\right)}}$$

where $f_r$ is a resonant frequency of the chamber 113d, $v$ is a volume of the chamber 113d, n is the number of holes in the wall 118b, r is a radius of each hole in the wall 118b, l is a thickness of the wall (or a length of the holes), and c is the speed of sound in air (e.g., about 343 m/s). When a frequency of vibration of the diaphragm 112d equals the resonant frequency, $f_r$, the transducer module 110d can emit a maximum sound pressure level.

VII. Computing Environments

Figure 18:
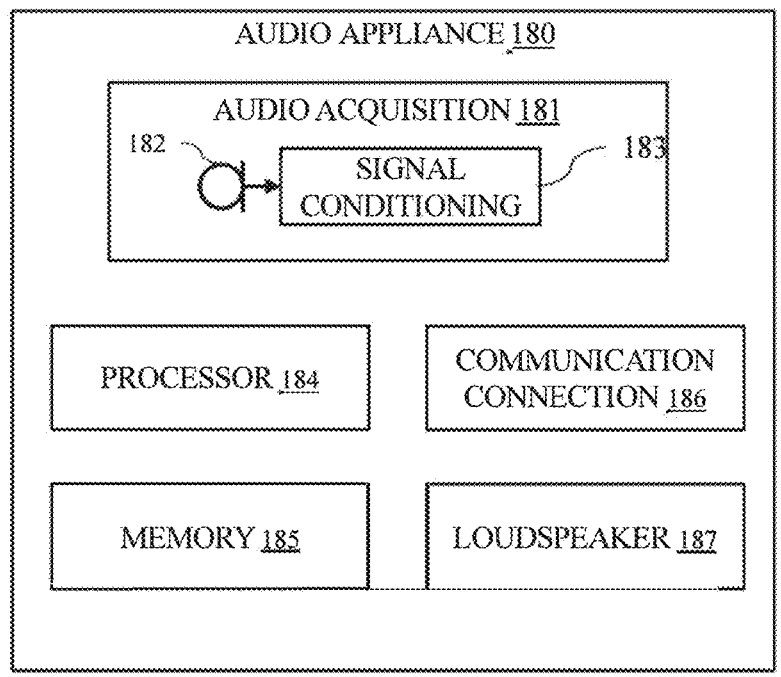
FIG. 18 illustrates a block diagram showing aspects of an audio appliance.

FIG. 18 shows an example of a suitable architecture for an audio appliance (e.g., a media device 10, in FIG. 1). The audio appliance 180 includes an audio acquisition module 181 and aspects of a computing environment (e.g., described more fully below in connection with FIG. 19) that can cause the appliance to communicate with an audio accessory in a defined manner. For example, the illustrated appliance 180 includes a processing unit 184 and a memory 185 that contains instructions the processing unit can execute to cause the audio appliance to, e.g., carry out one or more aspects of receiving an output from an ultrasonic proximity sensor and/or responding to an indication of an environment in which an audio accessory 20a, 20b (FIG. 1) is positioned.

For example, such instructions can cause the audio appliance 180 to capture ambient sound with the audio acquisition module 181 and to communicate some or all of an acquired audio signal over a communication connection 186 to a remote speech-recognition system (not shown). The captured ambient sound can include a user's uttered command. By way of further example, the speech-recognition system can extract such an uttered command from the audio signal and communicate a machine-readable command to the audio appliance 180 over the communication connection 186. The command can invoke an audio codec (not shown) and/or other instructions to cause the audio appliance to selectively play a song over a loudspeaker 187 or one or both audio accessories 20a, 20b.

Referring still to FIG. 18, an audio appliance typically includes a microphone transducer to convert incident acoustic signals to corresponding electrical output. As used herein, the terms "microphone" and "microphone transducer" are used interchangeably and mean an acoustic-to-electric transducer or sensor that converts an incident acoustic signal, or sound, into a corresponding electrical signal representative of the incident acoustic signal. Typically, the electrical signal output by the microphone is an analog signal.

Although a single microphone is depicted in FIG. 18, this disclosure contemplates the use of plural microphones. For example, plural microphones can be used to obtain plural distinct acoustic signals emanating from a given acoustic scene, and the plural versions can be processed independently and/or combined with one or more other versions before further processing by the audio appliance 180.

As shown in FIG. 18, the audio acquisition module 181 can include a microphone transducer 182 and a signal conditioner 183 to filter or otherwise condition the acquired representation of ambient sound. Some audio appliances have an analog microphone transducer and a pre-amplifier to condition the signal from the microphone.

As shown in FIG. 18, an audio appliance 180 or other electronic device can include, in its most basic form, a processor 184, a memory 185, and a loudspeaker or other electro-acoustic transducer 187, and associated circuitry (e.g., a signal bus, which is omitted from FIG. 18 for clarity).

The audio appliance 180 schematically illustrated in FIG. 18 also includes a communication connection 186, as to establish communication with another computing environment or an audio accessory, such as accessory 20a, 20b (FIG. 1). The memory 185 can store instructions that, when executed by the processor 184, cause the circuitry in the audio appliance 180 to drive the electro-acoustic transducer 187 to emit sound over a selected frequency bandwidth or to communicate an audio signal over the communication connection 186 to an audio accessory 20a, 20b for playback. In addition, the memory 185 can store other instructions that, when executed by the processor, cause the audio appliance 180 to perform any of a variety of tasks akin to a general computing environment as described more fully below in connection with FIG. 19.

Figure 19:
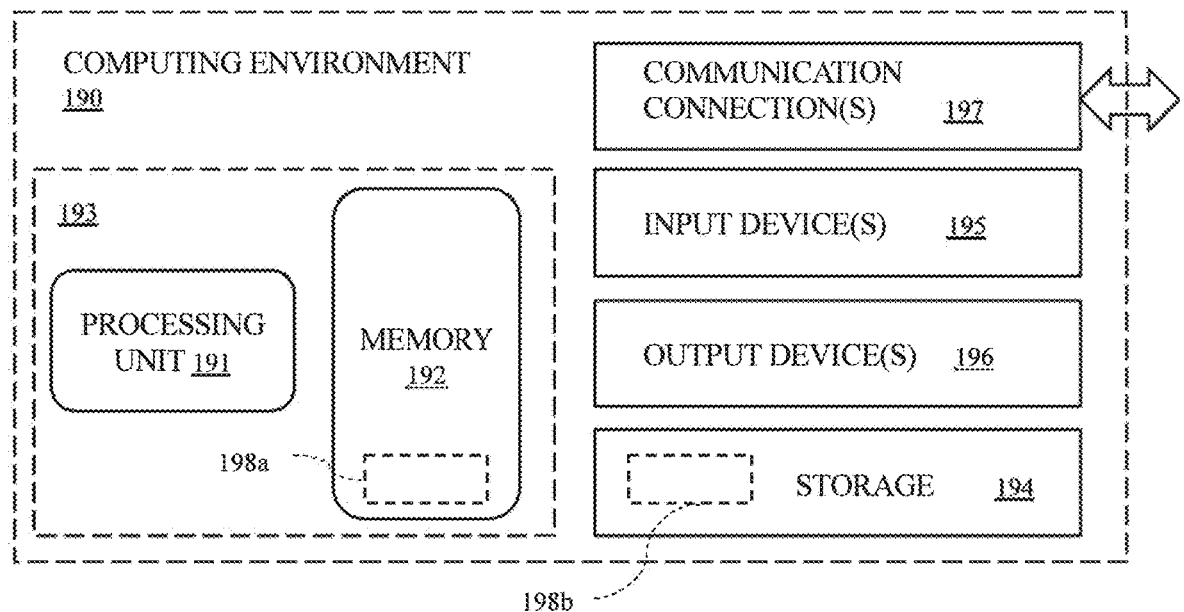
FIG. 19 illustrates a block diagram showing aspects of a computing environment.

FIG. 19 illustrates a generalized example of a suitable computing environment 190 in which described methods, embodiments, techniques, and technologies relating, for example, to assessing a local environment for the computing environment or an accessory thereto can be implemented. The computing environment 190 is not intended to suggest any limitation as to scope of use or functionality of the technologies disclosed herein, as each technology may be implemented in diverse general-purpose or special-purpose computing environments, including within an audio appliance. For example, each disclosed technology may be implemented with other computer system configurations, including wearable and/or handheld appliances (e.g., a mobile-communications device, such as, for example, IPHONE®/IPAD®/AIRPODS®/HOMEPOD™ devices, available from Apple Inc. of Cupertino, CA), multiprocessor systems, microprocessor-based or programmable consumer electronics, embedded platforms, network computers, minicomputers, mainframe computers, smartphones, tablet computers, data centers, audio appliances, and the like. Each disclosed technology may also be practiced in distributed computing environments where tasks are performed by remote processing devices that are linked through a communications connection or network. In a distributed computing environment, program modules may be located in both local and remote memory storage devices.

The computing environment 190 includes at least one central processing unit 191 and a memory 192. In FIG. 19, this most basic configuration 193 is included within a dashed line. The central processing unit 191 executes computer-executable instructions and may be a real or a virtual processor. In a multi-processing system, or in a multi-core central processing unit, multiple processing units execute computer-executable instructions (e.g., threads) to increase processing speed and as such, multiple processors can run simultaneously, despite the processing unit 191 being represented by a single functional block.

A processing unit, or processor, can include an application specific integrated circuit (ASIC), a general-purpose microprocessor, a field-programmable gate array (FPGA), a digital signal controller, or a set of hardware logic structures (e.g., filters, arithmetic logic units, and dedicated state machines) arranged to process instructions.

The memory 192 may be volatile memory (e.g., registers, cache, RAM), non-volatile memory (e.g., ROM, EEPROM, flash memory, etc.), or some combination of the two. The memory 192 stores instructions for software 198a that can, for example, implement one or more of the technologies described herein, when executed by a processor. Disclosed technologies can be embodied in software, firmware or hardware (e.g., an ASIC).

A computing environment may have additional features. For example, the computing environment 190 includes storage 194, one or more input devices 195, one or more output devices 196, and one or more communication connections 197. An interconnection mechanism (not shown) such as a bus, a controller, or a network, can interconnect the components of the computing environment 190. Typically, operating system software (not shown) provides an operating environment for other software executing in the computing environment 190, and coordinates activities of the components of the computing environment 190.

The store 194 may be removable or non-removable, and can include selected forms of machine-readable media. In general, machine-readable media includes magnetic disks, magnetic tapes or cassettes, non-volatile solid-state memory, CD-ROMs, CD-RWs, DVDs, magnetic tape, optical data storage devices, and carrier waves, or any other machine-readable medium which can be used to store information, and which can be accessed within the computing environment 190. The storage 194 can store instructions for the software 98b that can, for example, implement technologies described herein, when executed by a processor.

The store 194 can also be distributed, e.g., over a network so that software instructions are stored and executed in a distributed fashion. In other embodiments, e.g., in which the store 194, or a portion thereof, is embodied as an arrangement of hardwired logic structures, some (or all) of these operations can be performed by specific hardware components that contain the hardwired logic structures. The store 194 can further be distributed, as between or among machine-readable media and selected arrangements of hardwired logic structures. Processing operations disclosed herein can be performed by any combination of programmed data processing components and hardwired circuit, or logic, components.

The input device(s) 195 may be any one or more of the following: a touch input device, such as a keyboard, keypad, mouse, pen, touchscreen, touch pad, or trackball; a voice input device, such as one or more microphone transducers, speech-recognition technologies and processors, and combinations thereof; a scanning device; or another device, that provides input to the computing environment 190. For audio, the input device(s) 195 may include a microphone or other transducer (e.g., a sound card or similar device that accepts audio input in analog or digital form), or a computer-readable media reader that provides audio samples and/or machine-readable transcriptions thereof to the computing environment 190.

Speech-recognition technologies that serve as an input device can include any of a variety of signal conditioners and controllers, and can be implemented in software, firmware, or hardware. Further, the speech-recognition technologies can be implemented in a plurality of functional modules. The functional modules, in turn, can be implemented within a single computing environment and/or distributed between or among a plurality of networked computing environments. Each such networked computing environment can be in communication with one or more other computing environments implementing a functional module of the speech-recognition technologies by way of a communication connection.

The output device(s) 196 may be any one or more of a display, printer, loudspeaker transducer, DVD-writer, signal transmitter, or another device that provides output from the computing environment 190, e.g., an audio accessory 20a, 20b (FIG. 1). An output device can include or be embodied as a communication connection 197.

The communication connection(s) 197 enable communication over or through a communication medium (e.g., a connecting network) to another computing entity or accessory. A communication connection can include a transmitter and a receiver suitable for communicating over a local area network (LAN), a wide area network (WAN) connection, or both. LAN and WAN connections can be facilitated by a wired connection or a wireless connection. If a LAN or a WAN connection is wireless, the communication connection can include one or more antennas or antenna arrays. The communication medium conveys information such as computer-executable instructions, compressed graphics information, processed signal information (including processed audio signals), or other data in a modulated data signal. Examples of communication media for so-called wired connections include fiber-optic cables and copper wires. Communication media for wireless communications can include electromagnetic radiation within one or more selected frequency bands.

Machine-readable media are any available media that can be accessed within a computing environment 190. By way of example, and not limitation, with the computing environment 190, machine-readable media include memory 192, storage 194, communication media (not shown), and combinations of any of the above. Tangible machine-readable (or computer-readable) media exclude transitory signals.

As explained above, some disclosed principles can be embodied in a store 194. Such a store can include tangible, non-transitory machine-readable medium (such as microelectronic memory) having stored thereon or therein instructions. The instructions can program one or more data processing components (generically referred to here as a "processor") to perform one or more processing operations described herein, including estimating, computing, calculating, measuring, adjusting, sensing, measuring, filtering, correlating, and decision making, as well as, by way of example, addition, subtraction, inversion, and comparison. In some embodiments, some or all of these operations (of a machine process) can be performed by specific electronic hardware components that contain hardwired logic (e.g., dedicated digital filter blocks). Those operations can alternatively be performed by any combination of programmed data processing components and fixed, or hardwired, circuit components.

VIII. Other Embodiments

The examples described above generally concern ultrasonic proximity sensors, and related systems and methods. The previous description is provided to enable a person skilled in the art to make or use the disclosed principles. Embodiments other than those described above in detail are contemplated based on the principles disclosed herein, together with any attendant changes in configurations of the respective apparatus described herein, without departing from the spirit or scope of this disclosure. Various modifications to the examples described herein will be readily apparent to those skilled in the art.

For example, an earbud can also be equipped with various other sensors that can work independently or in concert with the proximity sensor described herein. For example, in some embodiments, the other sensors can take the form of an orientation sensor to help the earbud determine which ear the earbud is positioned within and then adjust operation of the earbud in accordance with that determination. In some embodiments, the orientation sensor can be a traditional inertial-based sensor while in other embodiments, sensor readings from another biometric sensor such as a proximity sensor or a temperature sensor can be used to make an orientation determination.

An earbud with the aforementioned sensors can also include additional sensors such as a microphone or array of microphones. In some embodiments, at least two microphones from a microphone array can be arranged along a line pointed towards or at least near the mouth of a user. By using information received by the orientation sensor or sensors, a controller within the earbud can determine which microphones of a microphone array should be activated to obtain this configuration. By activating only those microphones arranged along a vector pointed at or near the mouth, ambient audio signals not originating near the mouth can be ignored by applying a spatial filtering process.

Directions and other relative references (e.g., up, down, top, bottom, left, right, rearward, forward, etc.) may be used to facilitate discussion of the drawings and principles herein, but are not intended to be limiting. For example, certain terms may be used such as "up," "down,", "upper," "lower," "horizontal," "vertical," "left," "right," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" or "or", as well as "and" and "or." Moreover, all patent and non-patent literature cited herein is hereby incorporated by reference in its entirety for all purposes.

And, those of ordinary skill in the art will appreciate that the exemplary embodiments disclosed herein can be adapted to various configurations and/or uses without departing from the disclosed principles. Applying the principles disclosed herein, it is possible to provide a wide variety of damped acoustic enclosures, and related methods and systems. For example, the principles described above in connection with any particular example can be combined with the principles described in connection with another example described herein. Thus, all structural and functional equivalents to the features and method acts of the various embodiments described throughout the disclosure that are known or later come to be known to those of ordinary skill in the art are intended to be encompassed by the principles described and the features claimed herein. Accordingly, neither the claims nor this detailed description shall be construed in a limiting sense, and following a review of this disclosure, those of ordinary skill in the art will appreciate the wide variety of ultrasonic proximity sensors, and related methods and systems that can be devised under disclosed and claimed concepts.

Moreover, nothing disclosed herein is intended to be dedicated to the public regardless of whether such disclosure is explicitly recited in the claims. No claim feature is to be construed under the provisions of 35 USC 112(f), unless the feature is expressly recited using the phrase "means for" or "step for".

The appended claims are not intended to be limited to the embodiments shown herein, but are to be accorded the full scope consistent with the language of the claims, wherein reference to a feature in the singular, such as by use of the article "a" or "an" is not intended to mean "one and only one" unless specifically so stated, but rather "one or more". Further, in view of the many possible embodiments to which the disclosed principles can be applied, I reserve to the right to claim any and all combinations of features and technologies described herein as understood by a person of ordinary skill in the art, including, for example, all that comes within the scope and spirit of the following claims.

What is claimed is:

1. An electronic device, comprising:
   a housing having an internal surface and an external surface;
   a sensor, comprising:
      a plurality of ultrasonic transducers spaced apart along the internal surface of the housing, wherein the sensor, is configured to:
         emit a plurality of ultrasonic signals through at least a portion of the housing from the plurality of ultrasonic transducers, and
         detect a plurality of reflections of at least some of the emitted plurality of ultrasonic signals; and
      processing circuitry configured to:
         classify a contact on the external surface based on the detected plurality of reflections.

2. The electronic device of claim 1, wherein the ultrasonic signals from each of the plurality of ultrasonic transducers define a corresponding sensitive region of the housing.

3. The electronic device of claim 1, wherein each ultrasonic transducer is configured to generate an electrical signal responsive to one or more of the plurality of reflections of the at least some of the emitted plurality of ultrasonic signals.

4. The electronic device of claim 3, wherein the processing circuitry is configured to classify the contact on the external surface by:
   receiving the electrical signals from one or more of the ultrasonic transducers; and
   processing the electrical signals to assess whether or to what extent the housing is in contact with a desired environment.

5. The electronic device of claim 4, wherein the processing circuitry is configured to operate the electronic device based on the classification of the contact on the external surface.

6. The electronic device of claim 5, wherein the processing circuitry is further configured to classify the contact using more than one of the ultrasonic transducers.

7. The electronic device of claim 6, further comprising a speaker within the housing and wherein the processing circuitry comprises processing circuitry of the sensor.

8. The electronic device of claim 3, wherein each of the ultrasonic transducers comprises a piezoelectric material configured to generate the electrical signals responsive to a deformation of the piezoelectric material by one or more of the plurality of reflections of the at least some of the emitted plurality of ultrasonic signals.

9. The electronic device of claim 8, wherein each of the ultrasonic transducers includes one or more conductive layers configured to deform the piezoelectric material to emit one or more of the plurality of ultrasonic signals.

10. The electronic device of claim 1, wherein each of the ultrasonic transducers include one or more conductive layers configured to deform a piezoelectric material to emit one or more of the plurality of ultrasonic signals, and the detecting of the plurality of reflections is by the plurality of ultrasonic transducers.

11. An earbud, comprising:
    a housing having an internal surface and an external surface;
    a sensor, comprising:
       a plurality of ultrasonic transducers spaced apart along the internal surface of the housing, wherein the sensor, is configured to:
          emit a plurality of ultrasonic signals through at least a portion of the housing from the plurality of ultrasonic transducers, and
          detect a plurality of reflections of at least some of the emitted plurality of ultrasonic signals; and
       processing circuitry configured to:
          classify local surroundings that are in contact with the external surface based on the detected plurality of reflections.

12. The earbud of claim 11, wherein the contact comprises contact by a portion of a human body.

13. The earbud of claim 11, wherein each of the plurality of ultrasonic transducers defines a corresponding sensitive region of the housing.

14. The earbud of claim 11, wherein each ultrasonic transducer is configured to generate an electrical signal responsive to one or more of the plurality of reflections of the at least some of the emitted plurality of ultrasonic signals.

15. The earbud of claim 14, wherein the processing circuitry is configured to classify the local surroundings that are in contact with the external surface by:
    receiving the electrical signals from one or more of the ultrasonic transducers; and
    processing the electrical signals to assess whether or to what extent the housing is in contact with a desired environment.

16. The earbud of claim 11, wherein each of the ultrasonic transducers comprises a piezoelectric actuator that includes first and second opposed electrode layers, a layer of piezoelectric material laminated between the first and second opposed electrode layers, and a flexible coating covering at least a portion each of the first and second opposed electrode layers outward of the layer of piezoelectric material.

17. A method, comprising:
    emitting a plurality of ultrasonic signals through at least a portion of a housing of an electronic device with a plurality of ultrasonic transducers that are spaced apart along an interior surface of the housing;

detecting a plurality of reflections of at least some of the emitted plurality of ultrasonic signals; and determining an alignment of the electronic device with a user's ear based on the detected plurality of reflections.

18. The method of claim 17, wherein detecting the plurality of reflections comprises detecting the plurality of reflections with at least two of the ultrasonic transducers.

19. The method of claim 17, further comprising operating a speaker of the electronic device based on determining the alignment.

20. The method of claim 17, wherein emitting the plurality of ultrasonic signals comprises providing electrical signals to a piezoelectric material of each of the ultrasonic transducers.

21. The method of claim 20, wherein detecting the plurality of reflections comprises detecting the plurality of reflections using the piezoelectric material of the ultrasonic transducers.

\* \* \* \* \*